UNITED STATES PATENT OFFICE.

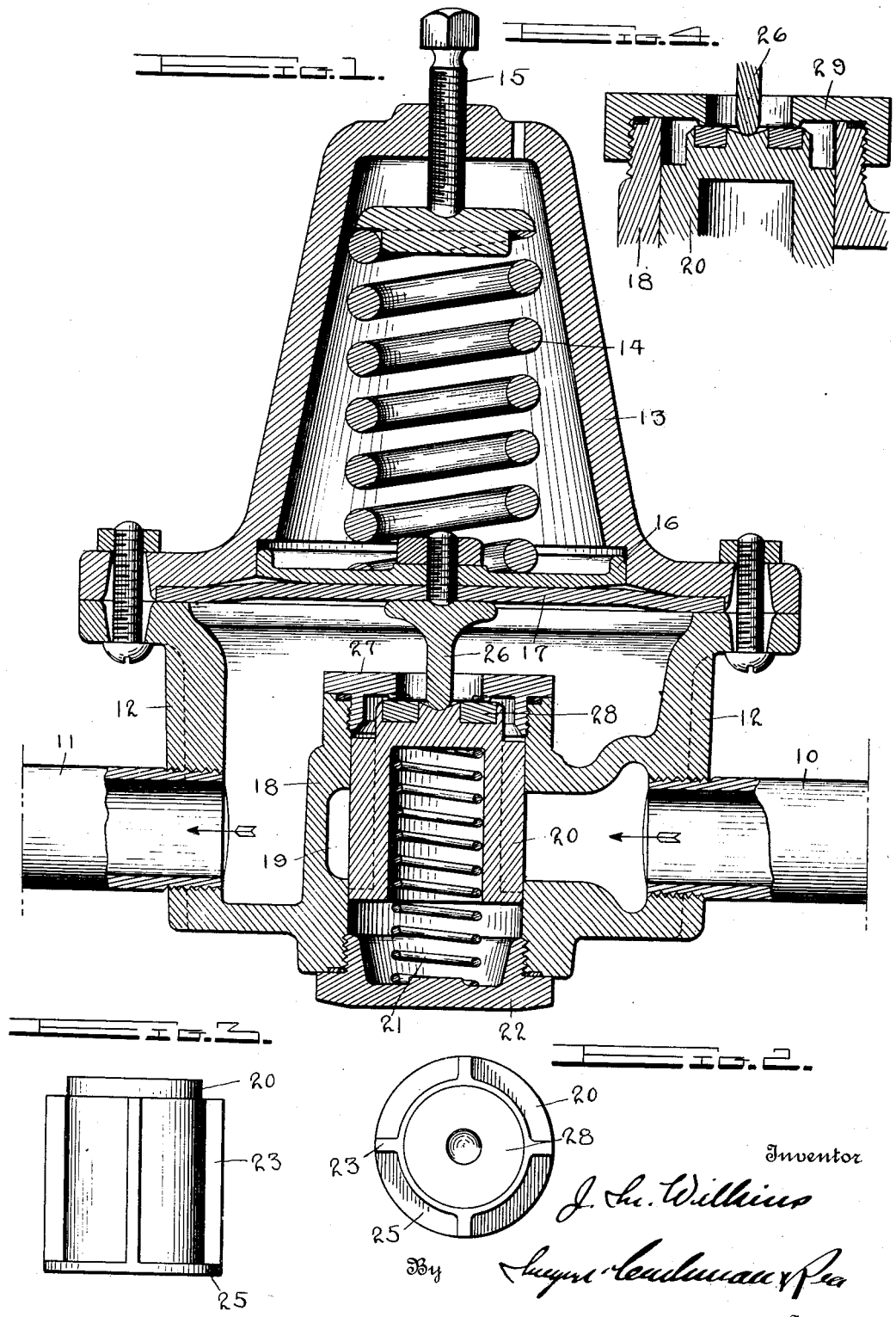

JAMES M. WILKINS, OF DECATUR, ILLINOIS, ASSIGNOR TO ADOLPH MUELLER, TRUSTEE, OF DECATUR, ILLINOIS.

PRESSURE REGULATOR.

1,410,089.  Specification of Letters Patent.  Patented Mar. 21, 1922.

Application filed July 9, 1917. Serial No. 179,533.

*To all whom it may concern:*

Be it known that I, JAMES M. WILKINS, a citizen of the United States, residing at Decatur, in the county of Macon and State of Illinois, have invented new and useful Improvements in Pressure Regulators, of which the following is a specification.

The present invention relates to fluid pressure regulators, and has for its object to provide a regulator in which a perfect regulation and delivery of the full volume of fluid will be secured regardless of whether or not the inlet pressure is high or low; in which the inlet valve will be suitably balanced so as to guard against "chattering" or water hammer during its operation, which "chattering" is deleterious to and destructive of diaphragms, where diaphragm control of the valve is used; and in which the delivery orifice may be conveniently changed to increase or decrease the volume without the necessity of substituting a regulator of different size, or materially changing its parts, this change in volume being effected by the changing of a single part of the regulator without disconnecting the regulator from the line.

In the drawings herewith I have illustrated one embodiment of my invention, but this embodiment is merely illustrative and not restrictive, as variation in structure may be made without departing from my invention.

In the drawings:

Figure 1 is a central vertical section of a regulator made in accordance with my invention.

Figure 2 is a plan view of the regulator controlling valve.

Figure 3 is a side elevation of the valve shown in Figure 2.

Figure 4 is a detail view in section showing a slightly different form of valve seat from that illustrated in Figure 1.

Referring to the drawings by numerals, like numbers indicating like parts in the several views, and having reference first to Figure 1, 10 is the inlet pipe, and 11 the delivery pipe of the line. The said pipes are threaded or otherwise suitably secured to the lower part 12 of the regulator casing. The upper part 13 of the regulator casing is of usual form, having the dome provided with clamping flanges which are secured to the clamping flanges of the casing 12 by suitable screws. Said upper casing 13 has the opening spring 14 with its regulator screw 15, which spring bears upon the plate 16 of the diaphragm 17, and said diaphragm, as shown, and as is customary, is clamped between the flanges of the two sections 12 and 13.

The lower section 12 is provided with a valve chamber 18 preferably formed integral with the casing 12, as shown in Figure 1, this chamber 18 rising centrally of the casing 12 and receiving the flow of the inlet pipe 10, the chamber 18 having preferably an enlarged annular portion 19 surrounding the valve 20, the said valve 20 being mounted in the chamber 18 so as to have free vertical movement therein, and being normally urged upwardly by a spring 21 which bears at its lower end upon a nut or cap 22 threaded into the bottom of the casing 12, and at its upper end entering the bore of the valve 20, as shown in Figure 1.

The valve 20, as shown in Figures 2 and 3, is provided with guiding wings 23 which bear against the walls of the chamber 18, and direct the movements of the valve. The combined area of the spaces between the wings 23 is so calculated as to be substantially equal to the cross sectional areas of the inlet and the delivery pipes, and at its lower end the said valve 20 is provided with a flange 25, against the upper and lower sides of which inlet pressure is substantially equal, for inlet pressure will, of course, enter and pass downwardly around the valve so as to stand against the underside thereof, there being sufficient fluid clearance between the flange and the wall of the chamber to permit pressure to pass beneath the valve. By this construction a fairly balanced valve will be secured, so far as inlet pressure is concerned, and a valve sensitive to variations in either high or low pressure lines will result. With such a construction as described wherein the combined area of the spaces between the wings 23 is equal to the cross-sectional areas of the inlet and delivery pipes it is possible for the total volume of water normally passed by the supply pipe to pass through the regulating valve. There will, of course, be a preponderance of pressure on the underside of the valve, but the balanced pressure on the flange 25 will give a smooth operation of the valve as it opens and closes under variations in diaphragm pressure, and, furthermore, when outlet pressure falls, and the opening spring acts on the diaphragm 17, and the push botton 26 carried by the diaphragm exerts opening pressure on the valve 20, it will respond quickly, and will not have a tendency to remain seated or open with difficulty because of extreme differences in pressure above and below the valve on the inlet side.

The said valve 20 seats upwardly against a valve seat 27, which, as shown, is preferably threaded interiorly of the top of the chamber 18, this valve seat 27 having a suitable aperture, and the valve 20 being provided with any suitable insert 28 to give a fluid tight engagement with the valve seat 27.

The purpose of forming this valve seat 27 so that it will be threaded interiorly of the chamber 18 is that by so doing the same die may be used for cutting the threads in the lower part of the chamber 18 to receive the nut or cap 22 that is used for threading a valve seat 27 in the upper part of the chamber 18.

It will be understood, however, that I do not confine myself to this particular construction, for I have shown in Figure 4 a construction in which the valve seat 29 is threaded exteriorly of the chamber 18.

It will be observed that the valve 20, and its insert 28, is of considerable radial area, and the purpose of this is to enable me to utilize valve seats having different sized outlets without changing the other parts of the regulator. It will be obvious that valve seats 27 having smaller or larger orifices may be utilized without the necessity of putting into the line a regulator of different size, and, furthermore, without the necessity of changing any of the parts, except to substitute one valve seat for another, and this is accomplished by providing a valve 20 of such construction that a relatively large number of valve seats having different sized orifices may be substituted one for the other.

It will be understood that such variations as are within the range of mechanical skill may be made without departing from the spirit of my invention.

I claim:—

1. In a fluid pressure regulator and in combination, a valve casing, a casing having valve controlling means therein, an inlet pipe to and an outlet pipe from said valve casing, a pressure controlling valve having an extended seat area housed in said chamber, and a removable cap member having a flow opening therethrough and a valve seat thereon against which the extended area of said valve seats.

2. In a fluid pressure regulator and in combination, a valve casing, a casing having valve controlling means therein, an inlet pipe to and an outlet pipe from said valve casing, a valve chamber in said valve casing open at both ends, a cap member closing one end of said valve chamber, a cap member closing the other end of said valve casing and having a flow opening therethrough and a valve seat thereon, and a pressure control valve in said chamber having an extended seat area adapted to engage the valve seat on said last named cap member.

3. In a fluid pressure regulator and in combination, a valve casing, a casing having valve controlling means therein, an inlet pipe to and an outlet pipe from said valve casing, a valve chamber integrally formed with said valve casing and open at both ends, a cap member closing one end of said valve chamber, a cap member closing the other end of said valve casing and having a flow opening therethrough and a valve seat thereon, and a pressure control valve in said chamber having an extended seat area adapted to engage the valve seat on said last named cap member.

4. In a fluid pressure regulator, and in combination, upper and lower casings, a diaphragm between said casings, inlet and outlet pipes to and from said lower casing, an integrally formed valve chamber in said lower casing having upper and lower orifices of equal diameter, a valve in said chamber, a chamber-closing cap threaded to the lower end of said valve chamber, and a removable and interchangable valve seat threaded to the upper end of said valve chamber.

In testimony whereof I have hereunto set my hand in presence of two subscribing witnesses.

JAMES M. WILKINS.

Witnesses:
L. H. BURLEIGH,
J. HEISLER.